United States Patent Office 3,495,130
Patented Feb. 10, 1970

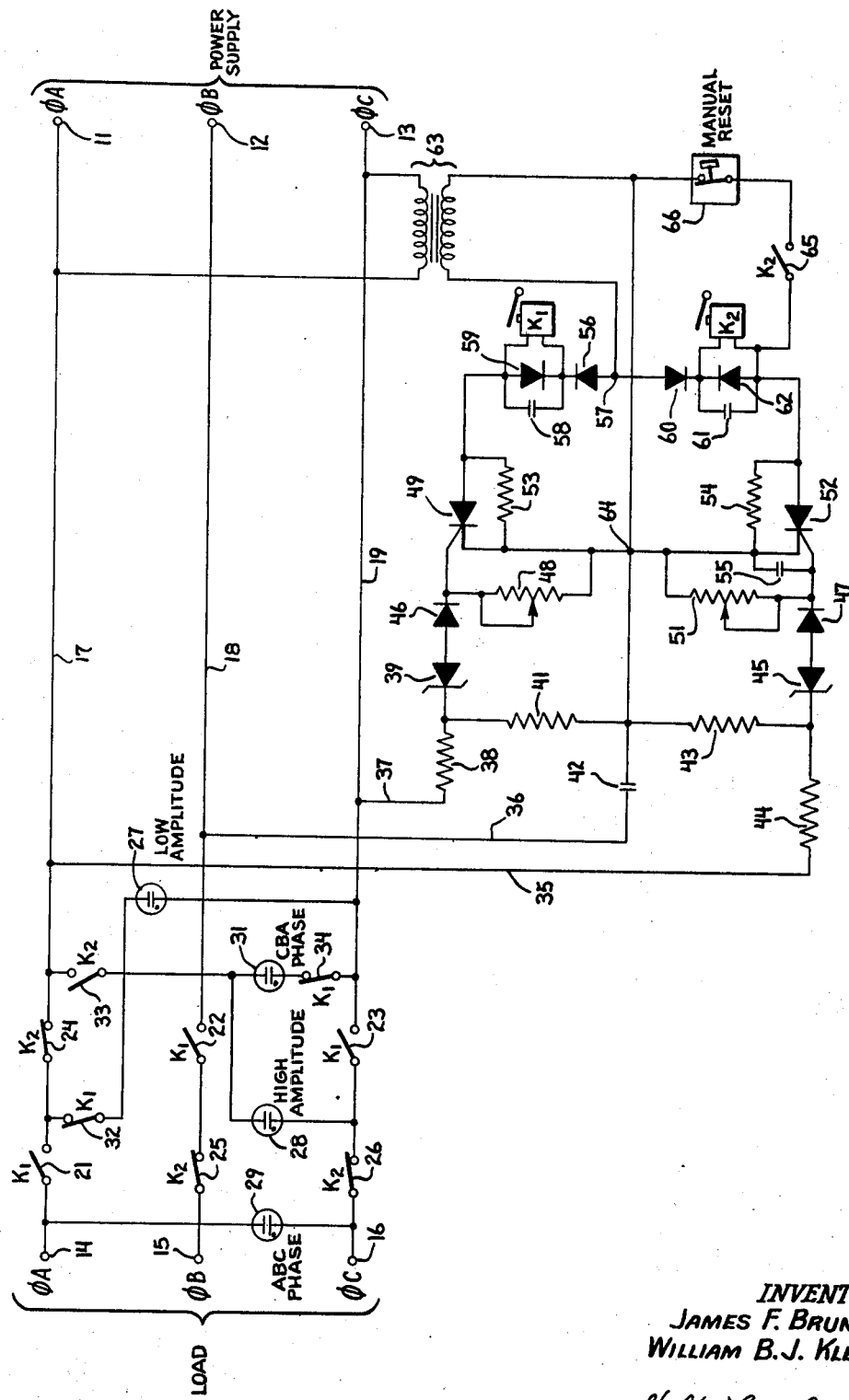

3,495,130
THREE-PHASE SEQUENCE AND AMPLITUDE DETECTION CIRCUIT
James F. Bruner, Romeoville, and William B. J. Klees, Chicago, Ill., assignors to the United States of America as represented by the Secretary of the Navy
Filed Feb. 12, 1968, Ser. No. 704,748
Int. Cl. H02h 3/28, 7/00, 3/26
U.S. Cl. 317—31                                6 Claims

ABSTRACT OF THE DISCLOSURE

A phase sequence and voltage amplitude detection circuit for coupling between a three-phase supply system and a load to detect incorrect phase sequence coupling and/or improper phase-to-phase voltage amplitude, and prevent coupling of the load to the system until both phase sequence and voltage amplitude are proper. Neon lamps are utilized for indicating proper and improper phase sequence, and high and low phase-to-phase voltage amplitude, and are employed in conjunction with novel solid state circuitry including silicon controlled rectifiers, Zener diodes, and ordinary diodes, for controlling the operation of a pair of coupling relays, one of which is actuated whenever the phase sequence is proper and the phase-to-phase voltage amplitude exceeds an adjustable, preset minimum value, the other being actuated when the phase-to-phase voltage amplitude exceeds an adjustable, preset maximum value and/or the phase sequence is improper.

BACKGROUND OF THE INVENTION

This invention is in the field of electrical safety and protection systems, and more specifically in the area of plural phase sequence and voltage amplitude sensing and protection devices.

It is well understood in the art that the improper phase coupling of a multi-phase power supply system to a load, or the proper phase coupling of a multi-phase power supply system having a phase-to-phase voltage amplitude above or below an acceptable range to a load may produce undesirable, dangerous, and occasionally disastrous consequences within the load, the supply system, and/or the adjacent area. Accordingly, a continuing need exists for reliable, non-complex protection circuitry for coupling between a multi-phase power supply system and a load to detect proper phase sequence and voltage amplitude. Such a circuit should include means for preventing the load from being coupled to the power system until both phase sequence and voltage amplitude are determined to be correct for the particular load which it protects. A protection means of this type should be reasonably economical to construct in order that it might be included as an integral part of the equipment, or load, which it is protect. Devices of the prior art have utilized resistance-capacitance circuitry for producing voltage phase shifts in multi-phase circuits to operate one indicating means if the phase sequence is proper or another if improper. Such devices are lacking in safety because they do not actively prevent coupling of the load to an improperly phased supply and are insensitive to phase-to-phase voltage amplitudes. Diode bridge circuits have been utilized for activating appropriate phase sequence lamps and permitting power to be connected to a load only when the phase sequence is proper. However, these devices are also insensitive to phase-to-phase voltage amplitudes. Semiconductor and relay circuits are known which sense high and low voltage amplitudes and permit power to be connected to the load only when the voltage is within a particular range. These devices usually provide no phase sequence detection, nor adjustment of the high-low voltage pass range. Thus it may be seen that these devices of the prior art, generally, sense either improper phase sequence or voltage amplitude, but not both. Many of these devices merely indicate improper conditions but fail to actively protect the associated equipment from overvoltage or improper phase sequence. Those circuits which do sense voltage amplitudes usually have high and low voltage limits which are either not adjustable or, at best, adjustable over a very small range. Many of these devices require external direct current (D.C.) power for operation in addition to the plural phase alternating current (A.C.) power supply voltage. The present invention overcomes these disadvantages of the prior art.

SUMMARY OF THE INVENTION

The present invention provides a phase sequence and voltage amplitude detection circuit to be coupled between a three-phase alternating current power supply system and a load for detecting incorrect phase sequence coupling and improper phase-to-phase voltage amplitude. It also prevents coupling of the load to the system until both phase sequence and voltage amplitude are proper. The invention utilizes various components including silicon controlled rectifiers, Zener diodes, and ordinary diodes in a novel solid state circuit for controlling the operation of a pair of coupling relays. One of these relays is actuated by the control circuit only if the phase sequence from the supply source is proper and the phase-to-phase voltage amplitude exceeds an adjustable preset minimum value, while the other relay is actuated only when the phase-to-phase voltage amplitude exceeds an adjustable preset maximum value and/or the phase sequence is improper. The circuit obtains all of its necessary power requirements from the three-phase power system without a need for any external D.C. power supply. If, initially, improper conditions of phase sequence and/or unacceptably low phase-to-phase voltage are found to exist which are subsequently corrected, the invention will automatically sense the corrected conditions and couple the power supply system to the load without a need for manual resetting. However, if the improper conditions initially sensed include unacceptably high phase-to-phase voltage, the invention provides a reset safety means which must be momentarily actuated after the unacceptably high voltage condition has been corrected in order for the invention to couple the power supply system to the load. The invention is stable over a wide range of ambient temperatures. Accordingly, a general object of this invention is to provide a protection means for coupling between a three-phase power supply system and a load for detecting and indicating phase sequence and voltage amplitude, and enabling the power supply system to be connected to the load only if both sequence and amplitude are proper.

BRIEF DESCRIPTION OF THE DRAWING

This general object, as well as other objects and the attendant advantages, features, and uses will become more apparent to those skilled in the art as the description proceeds when taken in consideration of the accompanying drawing, in which there is shown a schematic diagram of the invention.

DESCRIPTION OF THE PREFERRED EMBODIMENT

Referring more particularly to the figure of drawing, there is shown a schematic representation of the invention wherein terminals 11, 12, and 13 are provided for coupling to a three-phase power supply system, and terminals 14, 15, and 16 are provided for coupling to a three-phase load or equipment to be protected. Each of the conductors 17, 18, and 19, for phases A, B, and C respectively, has a contact from each of the relays K₁ and K₂ inserted in series therewith between the respective input and output terminals. As shown in the figure of drawing, contacts 21, 22, and 23 of relay K₁ are normally open when the relay K₁ is not energized, while contacts 24, 25, and 26 of relay K₂ are normally closed when the relay is not energized. A neon indicating lamp 27 is coupled, via normally closed contact 32 of relay K₁, across conductors 17 and 19 for indicating that the phase-to-phase voltage amplitude is below an adjustable preset minimum. A second neon indicating lamp 28 is coupled, via normally open contact 33 of relay K₂, across conductors 17 and 19 for indicating that the phase-to-phase voltage amplitude exceeds an adjustable preset maximum. A third neon indicating lamp 29 is coupled across output terminals 14 and 16 to indicate proper phase sequence (ABC), and a fourth neon indicating lamp 31 is coupled, via normally open contact 33 of relay K₂ and normally closed contact 34 of relay K₁, across conductors 17 and 19 to indicate improper phase sequence (CBA). These four lamps are energized to provide their respective indications in response to positioning of the various contacts of the relays K₁ and K₂ by the control circuit. Conductors 35, 36, and 37 couple the control circuitry of the invention to conductors 17 of phase A, 18 of phase B, and 19 of phase C respectively, of the power supply system. A resistance 38 is coupled between one end of conductor 37 and the junction of a Zener diode 39 with a resistance 41. A capacitance 42 couples conductor 36 to the junction of resistance 41 with a resistance 43, and a resistance 44 couples conductor 35 to the junction of resistance 43 with a Zener diode 45. Zener diodes 39 and 45 have their anode electrodes, respectively, coupled to the anode electrodes of diodes 46 and 47, whose respective cathode electrodes are coupled to the junctions of a potentiometer 48 with the control electrode of a silicon controlled rectifier (SCR) 49, and a potentiometer 51 with the control electrode of an SCR 52, respectively. A resistance 53 has one terminal coupled to the anode electrode of SCR 49 and the other coupled to its cathode electrode. In a like manner, a resistance 54 is coupled across the anode and cathode electrodes of SCR 52. A capacitance 55 is coupled between the control and cathode electrodes of SCR 52.

The anode electrode of SCR 49 is coupled to one of the terminals of the exciting coil of a relay K₁ whose other terminal is coupled via a diode 56 to a junction point 57. A capacitance 58 and a diode 59 are coupled in parallel across the coil of relay K₁. The SCR 52 has its anode electrode coupled to one terminal of the exciting coil of a relay K₂ whose other terminal is coupled via a diode 60 to junction point 57. A capacitance 61 and a diode 62 are coupled in parallel across the coil of relay K₂. A transformer 63 has its primary winding coupled across conductors 17 and 19 for receiving an alternating current potential from the three-phase power source which is transformed and coupled via its secondary winding to junction points 57 and 64 to provide excitation power for the coils of relays K₁ and K₂, via SCR's 49 and 52 and diodes 56 and 60. A normally open contact 65 of relay K₂ is coupled in circuit with a normally closed, manual reset switch means 66 between the coil of relay K₂ and transformer 63 to cause relay K₂, once actuated by the control circuitry in response to high phase voltage amplitude or improper phase sequencing conditions, to remain actuated until reset safety switch 66 has been momentarily opened and closed, or until the power source has been removed from input terminals 11, 12, and 13, causing relay K₂ to become de-energized due to a loss of exciting current from transformer 63, thereby opening safety contact 65.

For convenience in specifically describing one operating example of the invention, the following Table I lists various elements and components shown in the figure of drawing, with suitable values and types therefor. While this example of a working embodiment is provided herein, it is to be understood that these elements, components, and values are in no way to limit the invention thereto, as other values and other components of a like nature may be utilized to accomplish similar results.

TABLE I

| | |
|---|---|
| Lamps 27, 28, 29, and 31 | Neon indicating lamps. |
| Relays K₁ and K₂ | Any suitable relays with contact configurations shown. |
| Resistance 38 | 20,000 ohms. |
| Zener diode 39 | 1N758A. |
| Resistance 41 | 2,400 ohms. |
| Capacitance 42 | .02 mfd. |
| Resistance 43 | 5,600 ohms. |
| Resistance 44 | 16,000 ohms. |
| Zener diode 45 | 1N746A. |
| Diodes 46 and 47 | 1N483. |
| Potentiometers 48 and 51 | 5,000 ohms. |
| Silicon controlled rectifiers 49 and 52 | 2N2323A. |
| Resistances 53 and 54 | 430,000 ohms. |
| Capacitance 55 | Selected value. |
| Diodes 56, 59, 60, and 62 | 1N547. |
| Capacitances 58 and 61 | 50 mfd. |
| Transformer 63 | Selected to provide proper energizing voltages for relays K₁ and K₂. |

Resistances 38, 41, 43, and 44 are coupled with capacitance 42 to form a combining network for vectorially adding the phase-to-phase voltages from conductors 17, 18, and 19. If the proper phase rotation (ABC) is present, the voltage across resistances 38 and 41 will be approximately four times greater than the voltage across resistances 43 and 44. Zener diode 39, diode 46, and potentiometer 48 form a control circuit, which is coupled across the voltage divider formed by resistances 38 and 41, for controlling the operation of SCR 49 and thereby, the actuation of relay K₁. Potentiometer 48 provides means for adjusting the minimum acceptable level of voltage amplitude over a relatively wide range. Resistance 53 limits the back voltage across SCR 49 to a safe level within its rating. Capacitance 58 and diode 59 enable relay K₁ to maintain its operation on half-wave power from transformer 63 via diode 56 and SCR 49.

In a like manner, Zener diode 45, diode 47, and Potentiometer 51 form a control circuit for coupling across the voltage divider comprised of resistances 43 and 44 to control the operation of SCR 52 which, in turn, controls the actuation of relay K₂. Potentiometer 51 enables adjustment of the maximum acceptable level of voltage amplitude over a wide range. The back voltage across SCR 52 is maintained at a safe level within its rating by resistance 54, while capacitance 55 is chosen to slow down the operation of SCR 52 when desirable. Capacitance 61 and diode 62 enable relay K₂ to maintain its operation on half-wave power from transformer 63 via diode 60.

OPERATION

Referring now to the figure of drawing, it will be apparent to those skilled in the art that in order for the three-phase power coupled to input terminals 11, 12, and 13 to become available at output terminals 14, 15, and 16 for utilization by a load, the normally open contacts 21, 22, and 23 of relay K₁ must be placed in their closed positions and the normally closed contacts 24, 25, and 26 of relay K₂ must be maintained in their normally closed positions. These conditions will exist only when relay K₁ is actuated and relay K₂ is not actuated. If neither relay, only relay K₂, or both of the relays K₁ and $K_2$ are actuated, the invention will prevent the three-phase power source from being coupled to the load.

For purposes of explanation of the operation of the invention, various proper and improper conditions of phase sequencing and phase-to-phase voltage amplitude for the three-phase power source coupled to input terminals 11, 12, and 13 will be assumed, and the response of the invention to each of these combinations of conditions will be explained. Further, with reference to the figure of drawing, it will be assumed that relays $K_1$ and $K_2$ are in a nonactuated condition thereby placing the various contacts in the positions shown in the drawing, and that potentiometers 48 and 51 have been previously adjusted for the respective minimum and maximum acceptable levels of voltage amplitude. This may be accomplished by applying a properly sequenced (ABC) three-phase calibrating voltage of known adjustable value across input terminals 11, 12, and 13, initially at the lowest acceptable level of voltage amplitude and adjusting potentiometer 48 so that any lower voltage will fail to trigger SCR 49 into conduction. Then the amplitude of the calibrating voltage should be increased until the maximum acceptable level is reached, and potentiometer 51 adjusted so that any greater voltage level will cause SCR 52 to be triggered into conduction.

For the first combination of conditions, it will be assumed that a three-phase power source has been connected to input terminals 11, 12, and 13, having an acceptable level of voltage amplitude and coupled in such manner that the phase sequencing is proper (ABC). For this combination the invention will operate in the following manner. The three-phase potential will be coupled via conductors 17–35, 18–36, and 19–37 to the combining network comprised of capacitance 42 and resistances 38, 41, 43, and 44. For these assumed conditions of proper phase sequencing an acceptable voltage amplitude, the voltage across resistances 38 and 41 will be approximately four times that across resistances 43 and 44, and sufficiently high to cause Zener 39 to "break down" and trigger SCR 49, via diode 46, into conduction. When SCR 49 conducts, the half-wave energizing potential from transformer 63 will be applied across the coil of relay $K_1$ causing a current to flow from one end of the secondary winding of transformer 63 via junction 57, diode 56, the coil of relay $K_1$, SCR 49, and junction 64 back to the other end of the secondary winding of transformer 63. The current flow will cause relay $K_1$ to become actuated closing open contacts 21, 22, and 23, and opening closed contacts 32 and 34. Since the assumed source potential is of the proper phase rotation and voltage amplitude, the voltage across dividing resistances 43 and 44 will be too low to trigger SCR 52 via Zener diode 45, due to the setting of maximum acceptable level potentiometer 52. Therefore, relay $K_2$ will remain in its nonactuated condition. Thus it may be seen that for a power source with proper phase sequencing (ABC) and proper voltage amplitude, relay $K_1$ will be actuated and relay $K_2$ will remain nonactuated, thereby coupling input terminals 11, 12, and 13 directly to output terminals 14, 15, and 16 respectively, and causing "ABC phase" indicating lamp 29, coupled across output terminals 14 and 16, to become lighted.

A second possible combination of conditions might be a three-phase power source of proper phase rotation (ABC), but having unacceptably low phase voltage. In that event the voltage across dividing resistances 38 and 41 would still be approximately four times greater than that across resistances 43 and 44. However, neither voltage would be sufficient to "break down" the respective Zener diodes 39 and 45, leaving SCR 49 and SCR 52 in their nonconducting states and causing relays $K_1$ and $K_2$ to remain nonactuated. The various relay contacts would be positioned as shown in the figure of drawings, preventing the power supply from being coupled to the load and causing "low amplitude" indicating lamp 27, coupled across conductors 17 and 19 via closed contact 32 of relay $K_1$, to become lighted.

A third possible combination of conditions might be a three-phase power source of proper phase rotation (ABC), but having unacceptably high phase voltage. Under such conditions the voltage across dividing resistances 38 and 41 would exceed the value necessary to "break down" Zener diode 39 and trigger SCR 49 into conduction, thereby causing relay $K_1$ to become actuated. At the same time, the voltage across dividing resistances 43 and 44 would also exceed the value necessary to "break down" Zener diode 45 and trigger SCR 52 to actuate relay $K_2$, preventing the power supply from being coupled to the load by opening relay $K_2$ contacts 24, 25, and 26, causing "high amplitude" indicating lamp 28 coupled across conductors 17 and 19 via closed contacts 23 of relay $K_1$ and 33 of relay $K_2$ to become lighted, and causing normally open contact 65 of relay $K_2$ to become closed. Contact 65 in conjunction with reset safety switch 66 will maintain relay $K_2$ actuated as a safety precaution, indicating that unacceptably high amplitude previously existed, until reset switch 66 is momentarily opened and closed allowing relay $K_2$ to open or "drop out" if the unacceptably high voltage condition has been corrected.

Another possible combination of conditions might be a three-phase power source of acceptable phase-to-phase voltage amplitude, but having improper phase sequencing or rotation (CBA). Such conditions would produce a voltage across dividing resistances 43 and 44 approximately four times greater than that across dividing resistances 38 and 41 and of sufficient amplitude to "break down" Zener diode 45 and trigger SCR 52 into conduction, thereby actuating relay $K_2$ to prevent the power source from being coupled to the load and causing (CBA) phase indicating lamp 31, coupled across conductors 17 and 19 via contact 33 of relay $K_2$ and contact 34 of relay $K_1$, to become lighted.

An additional possible combination of conditions might include improper phase rotation combined with unacceptably low phase-to-phase voltage, in which case neither relay $K_1$ nor $K_2$ would be actuated, low amplitude light 27 would be lighted, and the power source would be prevented from being coupled to the load by open contacts 21, 22, and 23 of relay $K_1$.

As previously indicated, the embodiment of the invention shown in the figure of drawing includes a safety circuit comprised of contact 65 of relay $K_2$, and reset means 66 to provide a path of exciting current for relay $K_2$ around SCR 52. This circuit causes relay $K_2$, when once energized by the control circuit via Zener diode 45 and SCR 52 in response to conditions of unacceptably high phase-to-phase voltage amplitude and/or improper phase rotation of the power source voltage, to remain energized, thereby preventing coupling of the power source to the load, until reset means 66 is employed to momentarily break the circuit after the improper condition has been corrected, or until the power source is removed from input terminals 11, 12, and 13 causing relay $K_2$ to drop out and open contact 65. The invention will recover automatically from a condition of low amplitude phase-to-phase voltage when the condition is corrected, even if the embodiment includes this reset safety circuit. However, for a particular application it might be deemed more desirable that the invention recover automatically from all improper conditions immediately upon correction of the conditions, without the need of manual resetting. In that event it is to be understood that the safety circuit may be omitted to provide such full automatic recovery without varying from the scope of the invention.

Thus it may be seen, in view of the foregoing explanation and figure of drawing that the invention, a three-phase sequence and amplitude detection and protection circuit, is a very useful and necessary device for coupling between a three-phase power source and a load to prevent the source from being coupled to the load unless and until it is of the proper amplitude and phase rotation.

The invention described herein may be manufactured and used by or for the Government of the United States of America for governmental purposes without the payment of any royalties thereon or therefor.

We claim:

1. A phase sequence and voltage amplitude detection and control means for coupling a three-phase power source to a load only when the phase sequence and voltage amplitude of the source are proper comprising:

input terminal means for coupling to a source of three-phase power;

output terminal means for coupling to a three-phase load;

first and second coupling means coupled in series with one another between said input and said output terminal means, each said coupling means having a first condition wherein electrical conduction is provided therethrough and a second condition wherein electrical conduction therethrough is prevented, each said coupling means also having control means for receiving control signals to cause said coupling means to be independently placed either in said first or said second condition in response thereto;

electrical combining network means coupled across said input terminal means, for vectorially adding the phase-to-phase voltages from said source of three-phase power;

first and second sensing control means, each of said sensing control means having input means coupled to said electrical combining network means, said first sensing control means having output means coupled to said control means of said first coupling means for causing said first coupling means to be placed in said first condition only in response to indications of proper phase sequencing and phase-to-phase voltage amplitude above an adjustable minimum level when sensed by said first sensing control means from said electrical combining network means, and said second sensing control means having output means coupled to said control means of said second coupling means for causing said second coupling means to be placed in said second condition only in response to indications of improper phase sequencing or phase-to-phase voltage amplitude above an adjustable maximum level when sensed by said second sensing control means from said electrical combining network means, said input terminal means being directly coupled to said output terminal means only when said first and second coupling means are simultaneously in said first condition; and indicating means coupled to said first and second coupling means to be activated thereby, for indicating separately conditions of proper and improper phase sequencing, and high and low voltage amplitude.

2. A phase sequence and voltage amplitude detection and control means for coupling a three-phase power source to a load only when the phase sequence and voltage amplitude of the source are proper as set forth in claim 1 wherein Said first and second coupling means comprise first and second multicontact electrical relay means, said first and second conditons thereof comprise first and second positions of the armatures of said relay means, and said control means of said first and second coupling means each comprise the exciting coil of said relay means in circuit with a source of exciting potential and a solid state gating control means for receiving said control signals.

3. A phase sequence and voltage amplitude detection and control means for coupling a three-phase power source to a load only when the phase sequence and voltage amplitude of the source are proper as set forth in claim 1, wherein said electrical combining network means is comprised of phase shifting capacitance means and voltage dividing resistance means for vectorially summing the phase-to-phase source voltages to provide control potentials, indicative of the phase relationship and voltage amplitude of said source of three-phase power, to said input means of said first and second sensing control means.

4. A phase sequence and voltage amplitude detection and control means for coupling a three-phase power source to a load only when the phase sequence and voltage amplitude of the source are proper as set forth in claim 1 wherein said first and second sensing control means each comprise a solid state Zener diode means in circuit with diode rectifier means and adjustable potentiometer means, said adjustable potentiometer means in said first sensing control means enabling adjustment of the relative breakdown level of its associated Zener diode and thereby, the acceptable minimum level of voltage amplitude, and said adjustable potentiometer means in said second sensing control means enabling adjustment of the relative breakdown level of its associated Zener diode and thereby, the acceptable maximum level of voltage amplitude.

5. A phase sequence and voltage amplitude detection and control means for coupling a three-phase power source to a load only when the phase sequence and voltage amplitude of the source are proper as set forth in claim 1, wherein said indicating means comprise a separate neon indicating lamp for each condition to be indicated.

6. A phase sequence and voltage amplitude detection and control means for coupling a three-phase power source to a load only when the phase sequence and voltage amplitude of the source are proper as set forth in claim 2, wherein said electrical combining network means is comprised of phase shifting capacitance means and voltage dividing resistance means for vectorially summing the phase-to-phase source voltages to provide control potentials, indicative of the phase relationship and voltage amplitude of said source of three-phase power, to said input means of said first and second sensing control means;

said first and second sensing control means each comprise a solid state Zener diode means in circuit with diode rectifier means and adjustable potentiometer means, said adjustable potentiometer means in said first sensing control means enabling adjustment of the relative breakdown level of its associated Zener diode and thereby, the acceptable minimum level of voltage amplitude, and said adjustable potentiometer means in said second sensing control means enabling adjustment of the relative breakdown level of its associated Zener diode and thereby, the acceptable maximum level of voltage amplitude; and said indicating means comprise a separate neon indicating lamp for each condition to be indicated, the proper indicating lamp being activated by the appropriate positioning of the contacts of said first and second multi-contact electrical relay means.

References Cited

UNITED STATES PATENTS 2,862,111 11/1958 Richards et al. ____ 307—127 X
3,431,467 3/1969 Calfee _____ 317—47

LEE T. HIX, Primary Examiner

J. D. TRAMMELL, Assistant Examiner

U.S. Cl. X.R.

307—127, 130; 317—33, 47, 48